United States Patent [19]

Yamashita et al.

[11] Patent Number: 4,804,951
[45] Date of Patent: Feb. 14, 1989

[54] DISPLAY APPARATUS AND DRIVING METHOD THEREFOR

[75] Inventors: Shinichi Yamashita, Atsugi; Masahiko Enari, Yokohama; Mitsutoshi Kuno, Nakamachi; Atsushi Mizutome, Hayamamachi; Hideo Kanno, Kawasaki, all of Japan

[73] Assignee: Canon Kabushiki Kaisha, Tokyo, Japan

[21] Appl. No.: 794,151

[22] Filed: Nov. 1, 1985

[30] Foreign Application Priority Data

Nov. 6, 1984 [JP] Japan ................ 59-232335

[51] Int. Cl.$^4$ .................. G09G 3/34; G09G 3/36
[52] U.S. Cl. ..................... 340/719; 340/784; 350/333
[58] Field of Search ............... 340/719, 718, 783, 784, 340/802, 811, 812, 754; 315/169.1, 169.2, 169.3, 169.4; 350/333, 350.5

[56] References Cited

U.S. PATENT DOCUMENTS

| 4,250,503 | 2/1981 | Shanks | 340/754 |
| 4,368,523 | 1/1983 | Kawate | 340/784 |
| 4,386,352 | 5/1983 | Nonomura et al. | 340/719 |
| 4,393,380 | 7/1983 | Hosokawa et al. | 340/719 |
| 4,395,708 | 7/1983 | Lloyd | 340/718 |
| 4,447,812 | 5/1984 | Soneda et al. | 340/784 |
| 4,554,485 | 11/1985 | Yamada | 340/719 |
| 4,586,039 | 4/1986 | Nonomura et al. | 340/719 |
| 4,680,580 | 7/1984 | Kawahara | 340/784 |

FOREIGN PATENT DOCUMENTS 0079496 5/1983 European Pat. Off. .

Primary Examiner—Marshall M. Curtis
Assistant Examiner—Mahmoud Fatahi-yar
Attorney, Agent, or Firm—Fitzpatrick, Cella, Harper & Scinto

[57] ABSTRACT

An active matrix-type display device including a plurality of field effect transistors arranged in a matrix, a plurality of gate lines, an apparatus for combining the gate lines in a set of combinations each containing two or more gate lines and for changing the set of combinations, and a driver for sequentially driving the combinations of gate lines so that the gate lines contained in a combination are driven simultaneously and all the gate lines are scanned in one vertical scanning period.

24 Claims, 4 Drawing Sheets

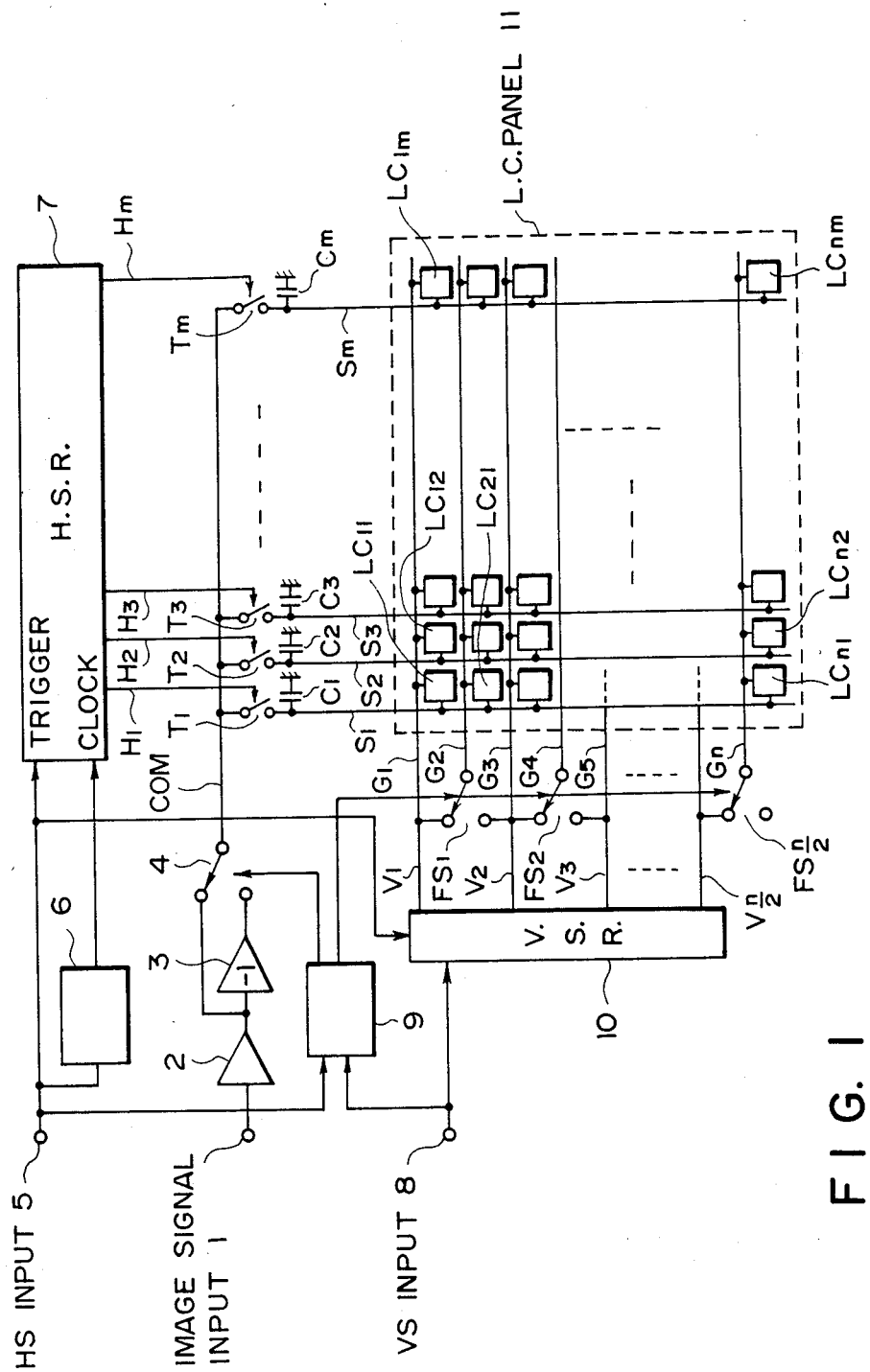
F I G. 1

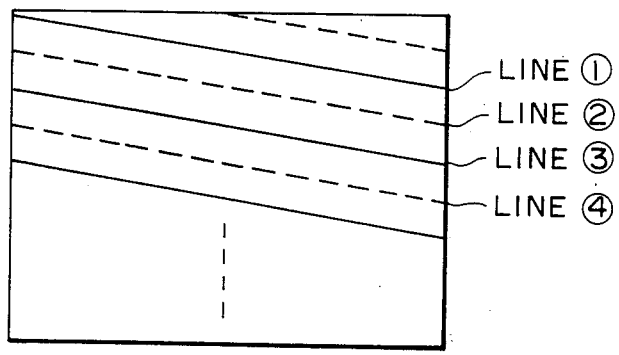
F I G. 2
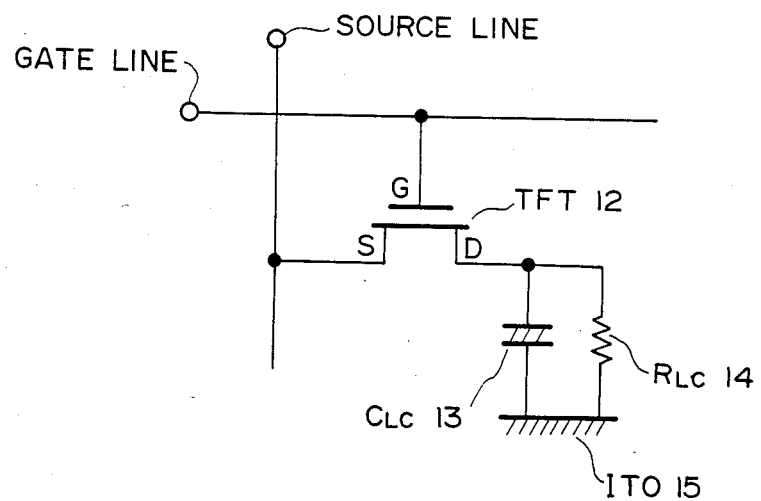
F I G. 3

DISPLAY APPARATUS AND DRIVING METHOD THEREFOR

FIELD OF THE INVENTION AND RELATED ART

The present invention relates to an active matrix-type display apparatus and a driving method therefor, and more particularly, to an image display apparatus for displaying television images or pictures.

Image display apparatus using a liquid crystal panel have heretofore been proposed for displaying television images. As a representative system therefor, there have been known an active matrix type display system, wherein thin film transistors (TFTs) as switching elements are arranged in the form of a matrix array on a substrate such as a glass plate and are used to directly drive a liquid crystal at respective picture elements.

In the case of ordinary television image display using a CRT (cathode ray tube), an interlaced scanning system is adopted for displaying images. In the interlaced scanning system, every other line is successively scanned horizontally and one whole picture is formed by successively scanning the image twice (two fields). In this case, the frequency of a vertical scanning is 60 Hz and one whole picture is displayed at a frequency of 30 Hz. This interlaced scanning system has advantages that the flickering of the picture is minimized and the level of minimum frequency for image signals can be increased, when compared with a non-interlaced scanning system wherein all the scanning lines are successively and downwardly scanned line by line.

On the other hand, when a liquid crystal device is driven by an AC voltage, the polarity of the driving voltage is required to be inverted every field. As a result, the driving frequency for each picture element is one-half that of one field, i.e., 15 Hz for the NTSC system. However, such low-frequency driving involves some problems. In an active-matrix type liquid crystal panel, each picture element is driven in such a manner that a voltage is stored in the capacitance thereof. Actually, however, it is difficult to store and hold the voltage in a frequency of 15 Hz. Alternatively, if the driving voltage is increased in order to compenstate the lowering in voltage, it is necessary to increase the withstand voltage of the driving circuit. This is very inconvenient for integrating the circuit. The low frequency also leads to occurrence of noticeable flickering.

SUMMARY OF THE INVENTION

In view of the above mentioned problems of the prior art, a principal object of the present invention is to provide an image display apparatus of a high image quality and a driving method therefor.

According to one aspect of the present invention, there is provided an active matrix-type display device, comprising: a plurality of field effect transistors arranged in the form of a matrix; means for sequentially driving the gate lines in such a manner that a plurality of gate lines are driven at a time so as to vertically scan the gate lines; and means for changing the combination of the plurality of gate lines driven at a time every vertical scanning period.

According to another aspect of the present invention, there is provided a driving method for an active matrix-type display apparatus comprising a plurality of picture elements arranged in the form of a matrix having a plurality of rows and a plurality of columns, each picture element comprising a pair of oppositely spaced electrodes and a liquid crystal disposed between the electrodes, a field effect transistor being connected to each picture element, the picture elements in a row being connected to a common gate line and the picture elements in a column being connected to a common source line, the driving method comprising: a frame operation of forming one picture frame in one frame period, one frame operation comprising an even number (M) of field operations, each field operation comprising sequentially applying writing signals to the picture elements in one field period in such a manner that a plurality of rows of picture elements are written at a time so as to vertically scan the rows sequentially, the combination of the plurality of rows being changed between an odd-numbered field and an even-numbered field.

According to still another aspect of the present invention, there is provided a driving method for an active matrix-type display apparatus comprising a plurality of picture elements arranged in the form of a matrix having a plurality of rows and a plurality of columns, each picture element comprising a pair of oppositely spaced electrodes and a liquid crystal disposed between the electrodes, a field effect transistor being connected to each picture element, the picture elements in a row being connected to a common gate line and the picture elements in a column being connected to a common source line; the driving method comprising: a frame operation of forming one picture frame in one frame period, one frame operation comprising an even number (M) of field operations, the even number of field operations including a field operation of sequentially applying writing signals to the rows of picture elements corresponding to the odd-numbered scanning lines of one picture frame, and a field operation of sequentially applying writing signals to the rows of picture elements corresponding to the even-numbered scanning lines of said one picture frame; the polarities of the writing signals being inverted every horizontal scanning period, and the polarity inversion pattern being changed for each period equal to a half the even number (M/2) of field periods.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a circuit diagram for showing a basic arrangement of the apparatus according to the invention;

FIG. 2 is a view showing a relationship between the scanning lines on a TV picture frame;

FIG. 3 is a view showing a detailed equivalent circuit diagram of a liquid crystal cell unit $LC_{11}, \ldots$ or $LC_{nm}$;

DETAILED DESCRIPTION OF THE PREFERRED EMBODIMENTS

Figure 4:
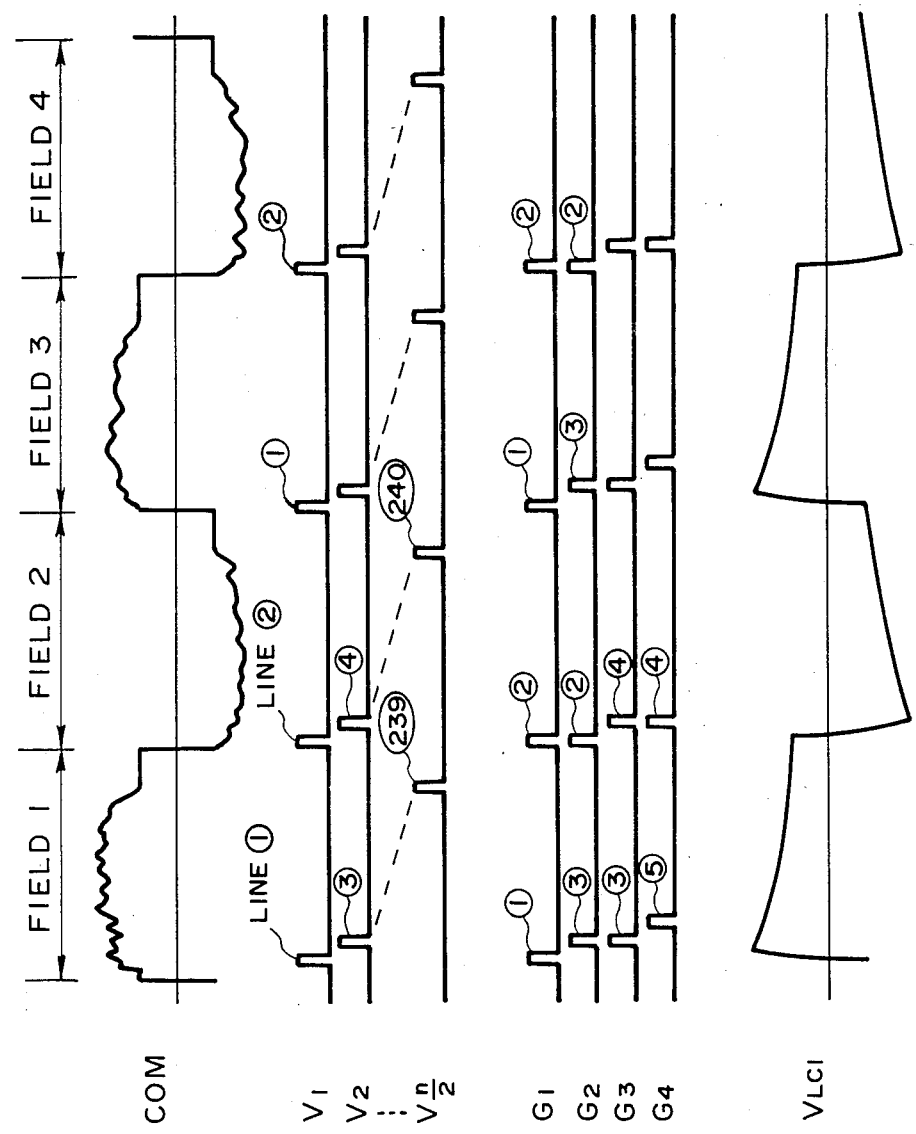
FIG. 4 illustrates driving waveforms in a first embodiment of the driving method according to the invention.

Technical feature of the present invention will now be described with reference to a specific embodiment.

Referring to FIG. 1, reference numeral 1 denotes an image signal input terminal; 2, an amplifier for amplifying the input image signal; 3, an inverter for inverting and amplifying the amplified image signal; 4, a polarity inversion switch for selecting either one of the outputs of the amplifier 2 and inverter 3 depending on the polarity of a signal obtained by dividing into a half the frequency of a vertical synchronizing signal which will be mentioned hereinafter; $T_1-T_m$, switches for distributing the signal selected by the switch 4 to capacitors $C_1-C_m$ corresponding to controlling signals $H_1-H_m$; $S_1-S_m$, source lines connected to capacitors $C_1-C_m$, respectively, of a liquid crystal panel 11; $G_1-G_n$, gate lines of the liquid crystal panel 11; $LC_{11}-LC_{nm}$, respective picture elements of the panel; 5, an input terminal for a horizontal synchronizing signal (referred to as "HS" hereinafter and in the drawings); 6, a clock pulse generator circuit for generating clock pulses m times as many as the HS; 7, a horizontal shift register for generating sequential scanning pulses $H_1-H_m$ in synchronism with the HS corresponding to the outputs of the clock pulse generator 6; 8, an input terminal for a vertical synchronizing signal (VS); 9, a pulse generator for frequency-dividing the VS to generate field- and frame-inversion signals; 10, a vertical shift registor for generating sequential scanning pulses $V_1-V_{n/2}$ which shifts by an HS period and synchronizes with the VS; and $FS_1-FS_{n/2}$, phase changeover switches for selecting the off-numbered or even-numbered pulses among the scanning pulses $V_1-V_{n/2}$ corresponding to frame pulses from the pulse generator and adding them to even-numbered lines among the gate lines $G_1-G_n$. This embodiment of the present invention is characterized in that two gate lines among the gate lines $G_1-G_n$ are scanned at a time and the combination patterns or modes of the two gate lines scanned at a time are changed over by utilizing the phase changeover switches.

Referring again to FIG. 1, an image signal such as an television signal is input to the image signal input terminal 1 and amplified to an amplitude level appropriate for driving the liquid crystal. The amplified image signal is supplied to the switch 4 and the inverter 3. The switch 4 selects the output of the amplifier 2 or inverter 3 depending on the polarity of the output signal from the pulse generator 9 and provides an image signal, the polarity of which is inverted every vertical scanning period, for applying a vertical synchronizing signal (shown at "COM" in FIG. 4). This is an operation required for AC-driving a liquid crystal. The signal is applied to the common terminal of the switches $T_1-T_m$ and distributed to the capacitors $C_1-C_m$ and the source lines $S_1-S_m$ connected to the $C_1-C_m$. The controlling signals $H_1-H_m$ are generated by inputting clock pulses m times as many as the horizontal synchronizing signal (HS) generated by the clock pulse generating circuit 6 to the horizontal shift register 7 and supplied sequentially from $H_1-H_m$ in one horizontal scanning period. By the signal $H_1-H_m$, the switches $T_1-T_m$ are sequentially placed in continuity for one clock pulse duration thereby to sample and hold in the capacitors $C_1-C_m$ the image signals corresponding to horizontally arranged picture elements $LC_{k1}-LC_{km}$ (k=1−n), respectively. The signals sampled and held in the capacitors $C_1-C_m$ are transferred to one line of picture elements $LC_{k1}-LC_{km}$ and displayed, when one of the gate lines $G_1-G_n$ is turned ON during one horizontal fly-back time for the image signal. To odd-numbered lines among the gate lines $G_1-G_n$ are sequentially applied signals $V_1-V_{n/2}$ for sequential scanning during one field generated with the HS as a clock pulse. On the other hand, to the even-numbered lines among the gate lines $G_1-G_n$ are sequentially applied signals respectively selected from adjacent pairs of signals among the signals $V_1-V_{n/2}$ through the function of the switches $FS_1-FS_{n/2}$ which are changed over depending on a field inversion signal generated by the pulse generator 9. The timing of the above mentioned driving operation is illustrated in FIG. 4. Thus, in one field (Field 2 in FIG. 4 and the state shown in FIG. 1), pairs of gate lines $G_1$ and $G_2$, $G_3$ and $G_4$, . . . are respectively driven simultaneously, while pairs of $G_2$ and $G_3$, $G_4$ and $G_5$, . . . are respectively driven simultaneously in another field (Field 1 in FIG. 4).

A circuit structure according to a first embodiment of the invention has been described with reference to FIG. 1. Here, some explanations will be made with respect to a relation between the scanning lines and the structure and operation of a liquid crystal picture element in a case where a display is actually provided on a picture frame.

FIG. 2 illustrates an arrangement of scanning lines on a television picture frame, wherein lines ①, ②, . . . correspond to lines ①, ②, . . . in FIG. 4. When the above mentioned scanning operation is conducted by using a circuit as shown in FIG. 1, information signals on lines ① and ②, are written in picture elements $LC_{11}-LC_{1m}$, information signals on lines ② and ③ are written in $LC_{21}-LC_{2m}$, . . . and so on, as a result. Where two lines of television information signals (an average of two lines) are displayed on one line of picture elements on a liquid crystal panel in this manner, a vertical resolution can be lowered but this is visually of no significant problem.

Next, the structure and operation of a picture element is explained with reference to FIGS. 3 and 4.

FIG. 3 shows an equivalent circuit depicted in rather detail of one of the picture elements $LC_{11}-LC_{nm}$, wherein a thin film transistor (TFT) 12 such as that formed of an amorphous silicon film is connected through its drain D to a liquid crystal cell forming a picture element of a liquid crystal panel, which cell comprises an equivalent capacitance $C_{LC}$ 13, a leakage resistance $R_{LC}$ 14 and a transparent counter electrode 15 of ITO (indium tin oxide).

Referring to FIG. 3, an image signal sampled and held in the manner described above is applied to a source line S and a vertical scanning signal is applied to a gate line G. The TFT is an FET (field effect transistor) formed of a film of, e.g., amorphous silicon, and the source-drain is made conductive when the gate line G is turned ON so that a voltage on the source line S is transferred to the equivalent capacitance $C_{LC}$ 13. The transferred voltage is stored in $C_{LC}$ 13 until the gate line is turned ON next time. As the voltage is discharged through the leakage resistance $R_{LC}$ 14, however, it takes a waveform as shown at $V_{LC1}$ in FIG. 4. In order to compensate the voltage decrease, it is necessary to use a larger source voltage, whereas it has been experimentally confirmed that such a voltage decrease does not present problems if the voltage holding time is up to that of one field. Further, the frequency of driving waveform down to a level of the order of 30 Hz does not cause noticeable flickering.

In the above embodiment, the COM signal is inverted every field. Instead thereof, the inversion may be carried out for each horizontal scanning period. A second embodiment adopting this system will be explained hereinbelow.

Figure 5:
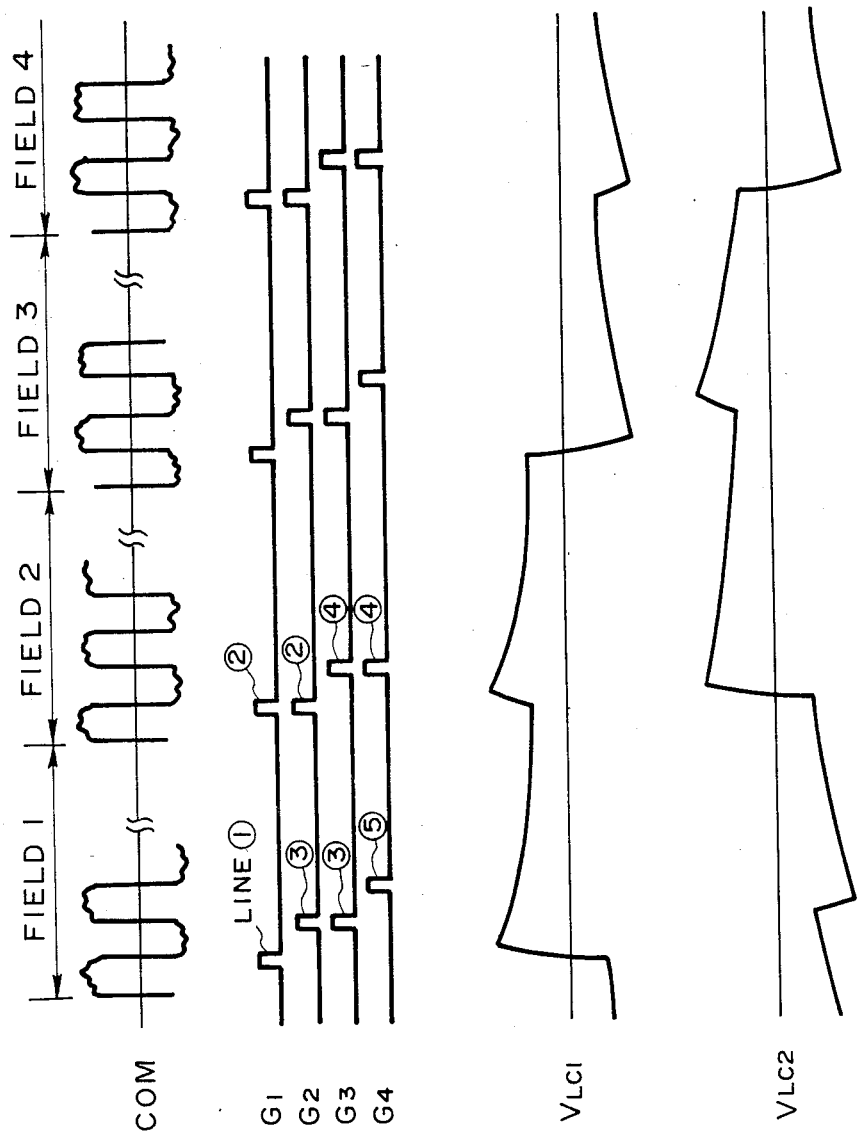
FIG. 5 illustrates driving waveforms in a second embodiment.

The circuit structure to be used in the second embodiment is substantially the same as that for the first embodiment as shown in FIG. 1. As shown in FIG. 1, the only difference is that the switch 4 is changed over every horizontal scanning period. FIG. 5 shows driving waveforms in this case.

The COM signal shown in FIG. 5 is inverted every horizontal scanning period, and the inversion phases are controlled by the pulse generator 9 so as to be switched every two fields. The COM signal is distributed to source lines $S_1$-$S_m$ and the gate lines $G_1$-$G_n$ are controlled in the same manner as in the first embodiment. As a result, the voltage waveform written in a liquid crystal cell assumes one as shown at $V_{LC1}$ or $V_{LC2}$ in FIG. 5. The frequency of $V_{LC}$ is lowered to 15 Hz which is different from 30 Hz in the first embodiment, the decrease in voltage due to leakage through the liquid crystal is prevented. Further, when compared with a conventional driving system, flickering is decreased because ripples in the driving waveform are decreased.

As described below, in the present invention, the gate lines of TFTs are scanned sequentially and two lines at a time and the combination phase or pattern of two lines to be scanned simultaneously are changed every field, whereby a voltage decrease due to leakage through a liquid crystal is compensated. As a result, a higher withstand voltage for a driving circuit is obviated to facilitate the integration of the circuit. Further, the image quality is improved because the flickering is minimized.

What is claimed is:

1. An active matrix-type display device, comprising:
   a plurality of field effect transistors arranged in a matrix,
   a plurality of gate lines, each gate line being connected to one or more of said field effect transistors;
   means for combining said plurality of gate lines in a first set of combinations for a vertical scanning period and for changing said first set of combinations to a second set of combinations for another vertical scanning period, each of said first set and second set of combinations containing two or more gate lines;
   means for sequentially driving said first set and second set of combinations while vertically scanning the gates lines in a manner such that the gate lines contained in a combination are driven simultaneously with respect to the gate lines scanned in each vertical scanning period.

2. The display device according to claim 1, wherein said vertical scanning period corresponds to the period of one field.

3. The display device according to claim 1, wherein each of said first set and second set of combinations contains two adjacent gate lines.

4. The display device according to claim 1, wherein said field effect transistor is a thin film transistor.

5. The display device according to claim 4, wherein said thin film transistor comprises a semiconductor film of amorphous silicon.

6. An active matrix-type display device, comprising:
   a plurality of field effect transistors arranged in a form of a matrix, a plurality of gate lines, each gate line being connected to one or more of said field effect transistors;
   means for combining said plurality of gate lines in a first set of combinations for a vertical scanning period and for changing said first set of combinations to a second set of combinations for another vertical scanning period, each of said first set and second set of combinations containing two or more gate lines;
   means for sequentially driving said first set and second set of combinations while vertically scanning the gate lines in a manner such that the gate lines contained in a combination are driven simultaneously with respect to the gate lines scanned in each vertical scanning period;
   means for inverting the polarity of an input image signal every vertical scanning period.

7. The displaly device according to claim 6, wherein said vertical scanning period corresponds to the period of one field.

8. An active matrix-type display device, comprising:
   a plurality of field effect transistors arranged in the form of a matrix,
   a plurality of gate lines, each gate line being connected to one or more of said field effect transistors;
   means for combining said plurality of gate lines in a first set of combinations for a vertical scanning period and for changing said first set of combinations to a second set of combinations for another vertical scanning period, each of said first set and second set of combinations containing two or more gate lines;
   means for sequentially driving said first set and second set of combinations while vertically scanning the gate lines in a manner such that the gate lines contained in a combination are driven simultaneously with respect to the gate lines scanned in each vertical scanning period
   means for inverting the polarity of an input image signal every horizontal scanning period.

9. The display device according to claim 8, wherein said vertical scanning period corresponds to the period of one field.

10. An active matrix-type display device, comprising:
    a plurality of field effect transistors arranged in the form of a matrix,
    a plurality of gate lines, each gate line being connected to one or more of said field effect transistors;
    means for combining said plurality of gate lines in a first set of combinations for a vertical scanning period and for changing said first set of combinations to a second set of combinations for another vertical scanning period, each of said first set and second set of combinations containing two or more gate lines;
    means for sequentially driving said first set and second set of combinations while vertically scanning the gate lines in a manner such that the gate lines contained in a combinations are driven simultaneously with respect to the gate lines scanned in each vertical scanning period;
    means for inverting the polarity of an input image signal every horizontal scanning period and
    means for changing the polarity of the inversion pattern every two vertical scanning periods.

11. The display device according to claim 10, wherein said vertical scanning period corresponds to the period of one field.

12. A driving method for an active matrix-type display apparatus comprising a plurality of picture elements arranged in the form of a matrix having a plurality of rows and a plurality of columns, each picture element comprising a pair of oppositely spaced electrodes and a liquid crystal disposed between the electrodes, a field effect transistor being connected to each picture element, the picture elements in a row being connected to a common gate line and the picture elements in a column being connected to a common source line;

said driving method comprising: a frame operation of forming one picture frame in one frame period, one frame operation comprising an even number of field operations including:

an odd-numbered field operation for defining a first set of combinations each containing two or more rows of picture elements, and sequentially applying writing signals to the picture elements while vertically scanning substantially all the rows in such a manner that the two or more rows of picture elements contained in each combination are written simultaneously, and an even-numbered field operation for defining a second set of combinations each containing two or more rows of picture elements, and sequentially applying writing signals to the picture elements while vertically scanning substantially all the rows in such a manner that the two or more rows of picture elements contained in each combination are written simultaneously.

13. The driving method according to claim 12, wherein said each frame operation comprises four field operations.

14. The driving method according to claim 12, wherein said plurality of rows written at a time are adjacent two rows.

15. The driving method according to claim 12, wherein said field effect transistor is a thin film transistor.

16. The driving method according to claim 15, wherein said thin film transistor comprises a semiconductor film of amorphous silicon.

17. The driving method according to claim 12, wherein the polarities of the writing signals applied im an odd-numbered field and in an even-numbered field are opposite to each other.

18. The driving method according to claim 12, wherein the polarities of the writing signals are inverted alternately every horizontal scanning period.

19. The driving method according to claim 18, wherein the polarity inversion pattern is changed for each period equal to a half of the even number of field operations.

20. A driving method for an active matrix-type display apparatus comprising a plurality of picture elements arranged in the form of a matrix having a plurality of rows and a plurality of columns, each picture element comprising a pair of oppositely spaced electrodes and a liquid crystal disposed between the electrodes, a field effect transistor being connected to each picture element, the picture elements in a row being connected to a common gate line and the picture elements in a column being connected to a common source line;

said driving method comprising a frame operation of forming one picture frame in one frame period, one frame operation comprising an even number of field operations, the even number of field operations including a field operation of sequentially applying writing signals to the rows of picture elements corresponding to the odd-numbered scanning lines of one picture frame, and a field operation of sequentially applying writing signals to the rows of picture elements corresponding to the even-numbered scanning lines of said one picture frame; the polarities of the writing signals being inverted every horizontal scanning period, and the polarity of the inversion pattern being changed for each period equal to a half of the even number of field periods.

21. The driving method according to claim 20, wherein said each frame operation comprises four field operations.

22. The driving method according to claim 20, wherein said field effect transistor is a thin film transistor.

23. The driving method according to claim 22, wherein said thin film transistor comprises a semiconductor film of amorphous silicon.

24. The driving method according to claim 20, wherein said picture frame is a television picture frame.

* * * * *

UNITED STATES PATENT AND TRADEMARK OFFICE
CERTIFICATE OF CORRECTION

PATENT NO. : 4,804,951
DATED : February 14, 1989
INVENTOR(S) : SHINICHI YAMASHITA, ET AL.   Page 1 of 3

It is certified that error appears in the above-identified patent and that said Letters Patent is hereby corrected as shown below:

IN [75] INVENTORS

"Mitsutoshi Kuno, Nakamachi;" should read
--Mitsutoshi Kuno, Tokyo;--.

COLUMN 1

Line 44, "compenstate" should read --compensate--.
Line 51, "above mentioned" should read --above-mentioned--.

COLUMN 3

Line 23, "vertical shift registor" should read --vertical shift register--.
Line 26, "off-num-" should read --odd-num- --.
Line 36, "an" (second occurrence) should read --a--.
Line 50, "the $C_1-C_m$." should read --the capacitors $C_1-C_m$.--.

COLUMN 4

Line 7, "above mentioned" should read --above-mentioned--.
Line 24, "above mentioned" should read --above-mentioned--.
Line 36, delete "rather".

UNITED STATES PATENT AND TRADEMARK OFFICE
CERTIFICATE OF CORRECTION

PATENT NO. : 4,804,951

DATED : February 14, 1989

INVENTOR(S) : SHINICHI YAMASHITA, ET AL.    Page 2 of 3

It is certified that error appears in the above-identified patent and that said Letters Patent is hereby corrected as shown below:

COLUMN 5

Line 17, "the decrease" should read --and the decrease--.
Line 63, "matrix, a plurality" should read --matrix,
¶ a plurality--.

COLUMN 6

Line 13, "displaly device" should read --display device--.
Line 34, "period" should read --period; and--.
Line 56, "combinations" should read --combination--.
Line 60, "period and" should read --period; and--.

COLUMN 7

Line 44, "im" should read --in--.

UNITED STATES PATENT AND TRADEMARK OFFICE
CERTIFICATE OF CORRECTION

PATENT NO. : 4,804,951

DATED : February 14, 1989

INVENTOR(S) : SHINICHI YAMASHITA, ET AL.   Page 3 of 3

It is certified that error appears in the above-identified patent and that said Letters Patent is hereby corrected as shown below:

COLUMN 8

Line 34, "field periods." should read --field operations--.

Signed and Sealed this

Nineteenth Day of December, 1989

Attest:

JEFFREY M. SAMUELS

*Attesting Officer*   *Acting Commissioner of Patents and Trademarks*